United States Patent [19]

Oya et al.

[11] 3,718,780

[45] Feb. 27, 1973

[54] ACTIVE PULSE TRANSMISSION CIRCUIT FOR AN INTEGRATED CIRCUIT

[75] Inventors: Yuichiro Oya, Kodaira; Akio Hayasaka, Kokubunji, both of Japan

[73] Assignee: Hitachi, Ltd., Tokyo, Japan

[22] Filed: Feb. 23, 1971

[21] Appl. No.: 117,915

[52] U.S. Cl. ................179/170 G, 178/70, 333/80 T

[51] Int. Cl. ................H04b 3/38

[58] Field of Search .....179/170 G; 178/70; 307/322; 333/80, 80 T, 23

[56] References Cited

UNITED STATES PATENTS

| | | | |
|---|---|---|---|
| 3,439,120 | 4/1969 | Levine | 179/170 G |
| 2,585,571 | 2/1952 | Mohr | 333/80 T |
| 3,173,026 | 3/1965 | Nagumo | 333/80 R |

OTHER PUBLICATIONS

Dimmer, "Two New Neg. Z VF Rptrs.," Automatic Electric Tech. J., Vol. 4, No. 3, 12/55, p. 108–118.

*Primary Examiner*—Ralph D. Blakeslee
*Attorney*—Craig, Antonelli, Stewart & Hill

[57] ABSTRACT

An active pulse transmission circuit for an integrated circuit comprising a plurality of T-shaped networks connected in series to each other, each having series input and output resistances and a parallel combination of a capacitance and a negative resistance device comprising two transistors cross-connected to each other and a plurality of resistances.

14 Claims, 7 Drawing Figures

INVENTORS
YUICHIRO OYA AND
AKIO HAYASAKA
BY Craig, Antonelli, Stewart & Hill
ATTORNEYS INVENTORS
YUICHIRO OYA AND
AKIO HAYASAKA
BY Craig, Antonelli, Stewart & Hill
ATTORNEYS

INVENTORS

YUICHIRO OYA AND

AKIO HAYASAKA

BY Craig, Antonelli, Stewart & Hill

ATTORNEYS

ACTIVE PULSE TRANSMISSION CIRCUIT FOR AN INTEGRATED CIRCUIT

BACKGROUND OF THE INVENTION

1. Field of the Invention

This invention relates to an active pulse transmission circuit for an integrated circuit or more in particular an active pulse transmission circuit wherein a two-terminal negative resistance circuit comprising a combination of two transistors and resistances is included in a pulse transmission circuit.

2. Description of the Prior Art

It is known to those skilled in the art that an active pulse transmission circuit, that is, a neuristor circuit (See "Neuristor - A Novel Device and System Concept," pages 2048 through 2060, I.R.E. Vol. 50, 1962) can be used as a pulse transmission circuit for a logical circuit, register circuit, memory circuit or scanning circuit of a panel display device. The neuristor circuit in which pulses are transmitted at a constant speed while their waveforms are regularly shaped is quite suitable as the above-mentioned pulse transmission circuit. However, active elements including a tunnel diode, a silicon controlled rectifier and a Gunn diode which are used in the active transmission circuit are very hard to "integrate" according to current technological standard.

Also, the pulse characteristics of the active transmission circuit including the pulse transmission velocity, pulse waveforms, threshold value and wave-shaping function largely depend upon the voltage-current curves of the active elements employed in the active pulse transmission circuit. However, each of the active elements shows an intrinsic voltage-current curve, which is very difficult to change physically or through a circuit arrangement. Therefore, in spite of their excellent characteristics, the conventional active pulse transmission circuits have limited applications.

In addition, the conventional active pulse transmission circuits are unable to supply sufficient power to drive light-emitting elements such as a luminescense diode for panel display. This necessitates an additional means for amplification, complicating the device.

SUMMARY OF THE INVENTION

An object of this invention is to provide an active pulse transmission circuit which permits integration.

Another object of this invention is to provide an active pulse transmission circuit which permits a change in the pulse transmission characteristics.

Still another object of this invention is to provide an active pulse transmission circuit which is able to transmit pulses having a large amplitude.

In order to achieve the above-mentioned objects, one of the active pulse transmission circuits for the integrated circuit of this invention comprises a plurality of T-shaped networks connected in series to each other, each having series input and output resistances and a parallel combination of a capacitance and a negative resistance device comprising two transistors cross-connected to each other and a plurality of resistances.

DESCRIPTION OF THE PREFERRED EMBODIMENTS

Figure 1A:
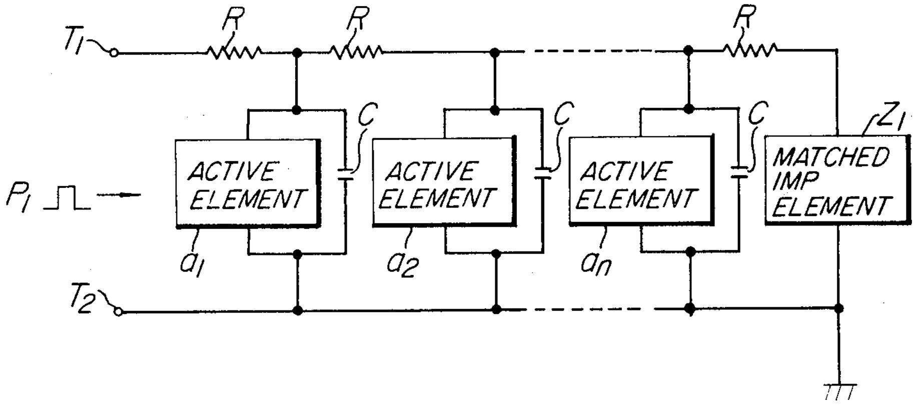
FIGS. 1*a* and 1*b* are circuit diagrams showing embodiments of this invention.

Referring to FIG. 1*a*, an active pulse transmission circuit comprises a plurality of series-connected T-shaped networks including resistances R and capacitances C, each of the capacitances C being connected in parallel with an active element $A_n$ ($n = 1, 2, \ldots$). The transmission circuit has at its end an impedance element $Z_1$ for the purpose of matching.

In this active pulse transmission circuit, a pulse $P_1$ which is applied to the input terminals $T_1$ and $T_2$ is transmitted from the input to output terminal, while being shaped in waveform, at a constant speed as in the well-known active pulse transmission circuit with, for example, a tunnel diode inserted in an active element $A_n$. As a result, an output can be produced from junction points, for example, both terminals of the active element $A_n$. Each of the active elements $A_1, A_2, \ldots A_n$ consists of a two-terminal negative resistance circuit as shown in FIG. 1*b*.

Figure 1B:
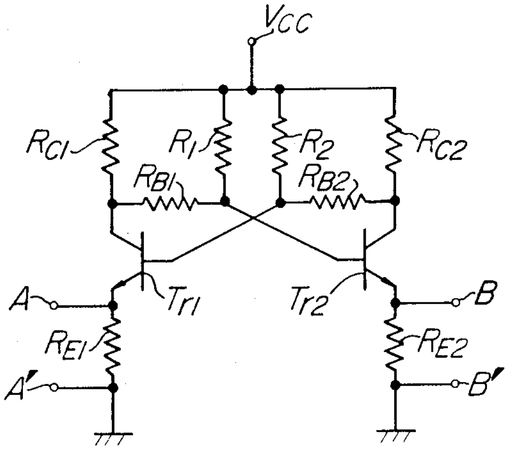

In FIG. 1*b*, the bases of two transistors $T_{r1}$ and $T_{r2}$ are connected, through resistances $R_{B2}$ and $R_{B1}$ respectively, to the collectors of the transistors $T_{r2}$ and $T_{r1}$ respectively. The emitters of the transistors $T_{r1}$ and $T_{r2}$ are grounded through the emitter resistances $R_{E1}$ and $R_{E2}$ respectively, while the collectors thereof are connected to a driving-voltage terminal $V_{cc}$ through collector resistances $R_{c1}$ and $R_{c2}$ respectively. Incidentally, characters $R_1$ and $R_2$ show resistances. In this circuit, a voltage-current curve across the emitter resistance $R_{E1}$ or $R_{E2}$, namely, between the terminals A and A' or B and B', as will be described later, is characterized by an N-shaped negative resistance. Therefore, an active pulse transmission circuit may be formed by connecting the terminal A, as shown in FIG. 1b, with the line shown in FIG. 1a including the terminal $T_1$ in series with the resistance R and connecting the terminal A' with the line including terminal $T_2$.

It is not merely between the terminals A and A' or B and B' but between given junction points, for example, across each resistance in the circuit of FIG. 1*b* that the N-shaped voltage-current curve of a negative resistance characteristic can be obtained. These junction points, therefore, can be used alternatively, but the operation is more stable between the terminals A and A' or B and B'. Moreover, the voltage-current curve, which develops between terminals as a result of cutting off a given portion of the circuit, for example, the emitter of transistor $T_{r1}$ from the emitter resistance $R_{E1}$, shows an S-shaped negative resistance characteristic and can be another alternative.

The reason why the circuit of FIG. 1*b* possesses a two-terminal negative resistance characteristic will be explained in detail below with reference to the terminals A and A' as an example. For convenience' sake, reference is made to the circuit of FIG. 2*a* which is a basic circuit of that as shown in FIG. 1*b*, and the operations of the two circuits are almost the same.

Figure 2A:
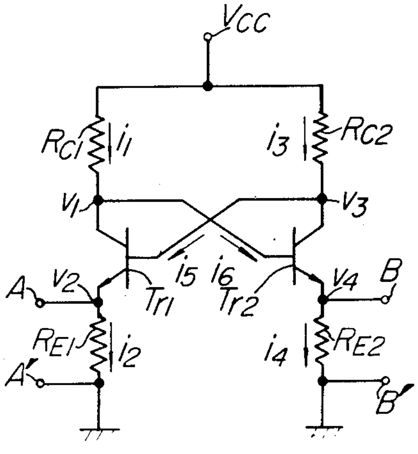
FIG. 2*a* is a diagram showing a basic circuit arrangement for explaining the operations of the embodiment as shown in FIG. 1*b*.

In FIG. 2*a*, like characters show like parts in FIG. 1*b*, the characters $i_1, i_2, \ldots i_6$ indicating currents flowing in the portions of the circuit of FIG. 2*a* respectively indicated by arrows. $V_1$, $V_3$ and $V_2$, $V_4$ show collector and emitter voltages of the transistors $T_{r1}$ and $T_{r2}$ respectively. There are two kinds of this circuit, namely, a saturated type in which the transistors $T_{r1}$ and $T_{r2}$ are operated to the saturation point, and a non-saturated type in which they are operated below the saturation point. The explanation below is based on the saturated type.

Figure 2B:
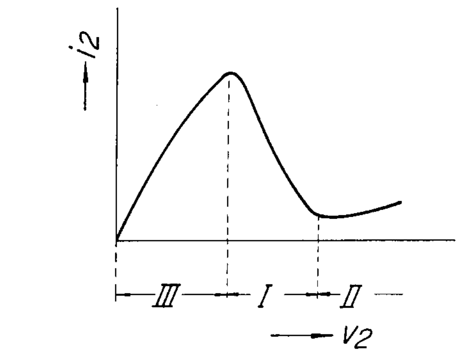
FIG. 2*b* is a diagram showing the voltage-current curve of the two-terminal negative resistance circuit as shown in FIG. 2*a*.

When one of the two transistors is saturated, the other is cut off thereby to stabilize the circuit, and it is known that the circuit is in an unstable active state in the transitional stage between the two stable states (i.e., when the transistor $T_{r1}$ is saturated and when the transistor $T_{r2}$ is saturated). The voltage-current characteristic of the two-terminal negative resistance circuit which develops between the terminals A and A' will be explained below with reference to FIG. 2*b*.

1. When both the transistors $T_{r1}$ and $T_{r2}$ are active, that is, are capable of amplification, an increase in the voltage $V_2$ (which is equivalent to the application of a pulse $P_1$) causes the value $|V_3 - V_2|$ to drop, thereby reducing the current $i_5$. With the decrease in the current $i_5$, the current $i_1$ which is determined by the equation $i_1 \cong \beta_1 i_5$ (where $\beta_1$ is an amplification factor of transistor $T_{r1}$) is decreased. Then the voltage $V_1$ which is determined by the equation $V_1 = V_{cc} - i_1 R_{c1}$ rises. The increase in the voltage $V_1$ results in an increase in $|V_1 - V_4|$, increasing the current $i_6$. The rise in current $i_6$ causes an increase in the current $i_3$ which is determined by the equation $i_3 \cong \beta_2 i_6$, where $\beta_2$ is an amplification factor of the transistor $T_{r2}$. This increase in the current $i_3$ is followed by a drop of the voltage $V_3$ determined by the equation $V_3 = V_{cc} - i_3 R_{C2}$, thereby further reducing the value $|V_3 - V_2|$. In other words, this circuit has the function of a positive feedback. As a consequence, so far as the transistors $T_{r1}$ and $T_{r2}$ maintain the amplification factors $\beta_1$ and $\beta_2$ respectively, the current $i_2$ $(= i_1 + i_5)$ is decreased as the voltage $V_2$ increases, developing a negative resistance characteristic between terminals A and A' as indicated by region I of FIG. 2*b*.

2. When the transistor $T_{r1}$ is cut-off: The transistor $T_{r1}$ enters a cut off state and the current $i_1$ is maintained constant $(\cong 0)$ as an increase in the voltage $V_2$ causes the current $i_5$ to be decreased below a certain value. The voltage-current characteristic at this time is indicated by the region II of the curve shown in FIG. 2b.

3. When the transistor $T_{r1}$ is saturated: The transistor $T_{r1}$ is saturated and begins conducting when a drop in the voltage $V_2$ causes the current $i_5$ to rise above a certain value. The result is the characteristic indicated by the region III of FIG. 2*b*, which develops between the terminals A and A'.

It will be understood from the above description that this circuit which has an N-shaped curve of a negative resistance characteristic can be used as an active element. This active element comprises two transistors and a plurality of resistances and therefore can be easily integrated by the conventional IC technique. Also, the negative resistance characteristic of this active element can be changed, as desired, by varying the characteristic of the two transistors and resistances and the driving voltage $V_{cc}$. This also makes it possible to change, as occasion demands, the transmission characteristics of the active pulse transmission circuit according to the present invention. Further, because of the combinations of transistors and resistances, the active pulse transmission circuit can be used with a relatively large electric power.

Figure 3:
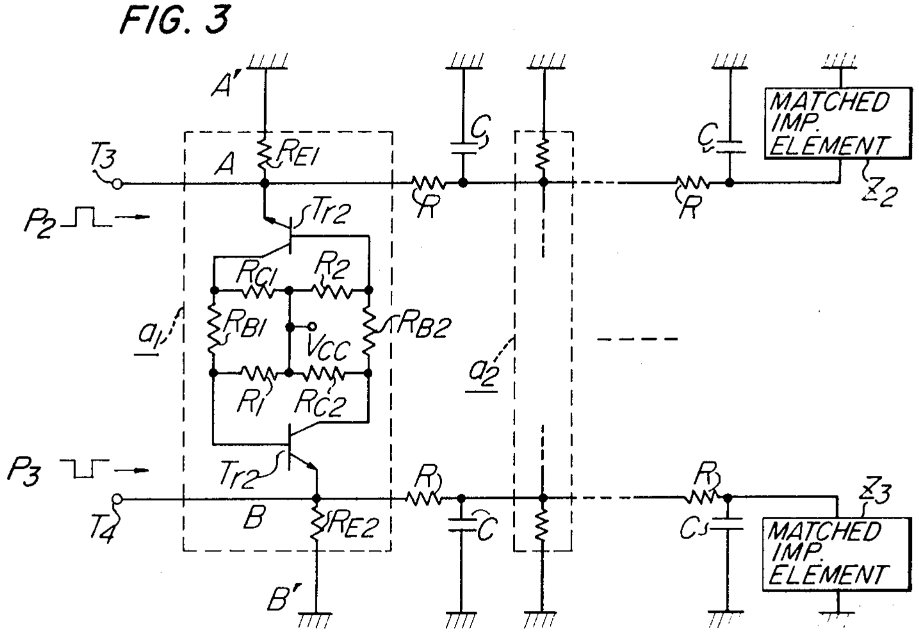
FIG. 3 is a circuit diagram showing another embodiment of this invention.

A circuit diagram of another embodiment of the invention is illustrated in FIG. 3, wherein like characters indicate like parts as shown in FIGS. 1*a* and 1*b*. $T_3$ and $T_4$ show input terminals, to which pulses $P_2$ and $P_3$ with opposite polarities are applied respectively. $Z_2$ and $Z_3$ show matched impedance elements for matching.

The active pulse transmission circuit as shown in FIG. 1*a* shows a case in which the negative resistance characteristic between, for example, terminals A and A' is used instead of between terminals B and B' of the active element as shown in FIG. 1*b*. However, the active element of FIG. 1*b* is so constructed that when positive pulses are obtained between the terminals A and A', negative pulses are produced between the terminals B and B'. Taking advantage of this characteristic, it is possible to construct two active pulse transmission circuits by means of a set of active elements (consisting of members $a_1, a_2, \ldots a_n$). This concept may be materialized in the circuit of FIG. 3, in which the terminal A of each of the active elements $a_1, a_2, \ldots a_n$ is connected to the terminal $T_3$, and a positive pulse $P_2$ is applied between the terminal $T_3$ and the earth. On the other hand, the terminal B of each of the active elements $a_1, a_2, \ldots a_n$ is connected to the line leading to the terminal $T_4$ and a negative pulse $P_3$ is applied between the terminal $T_4$ and the earth. As in the first embodiment, the waveforms of positive and negative pulses $P_2$ and $P_3$ are shaped as they are transmitted at a certain speed through each of the active pulse transmission circuits.

Thus, the use of the two-terminal negative resistance circuit of FIG. 1*b* as an active element makes possible simultaneous transmission of both positive and negative pulses. Further to this advantage, since the transistors $T_{r1}$ and $T_{r2}$ are triggered by positive and negative pulses respectively, the operation is more stable and variations in characteristics and erroneous operations due to noises are minimized. In addition, this circuit is advantageous in that "YES" and "NO" outputs for logical operations are simultaneously produced. It is needless to say that this circuit can be used as an active pulse transmission circuit exclusive to one of the logical outputs. Also, a PN junction capacitance formed in the integrated circuit may be utilized as the capacitance C inserted in the transmission circuit according to the above embodiment.

Figure 4:
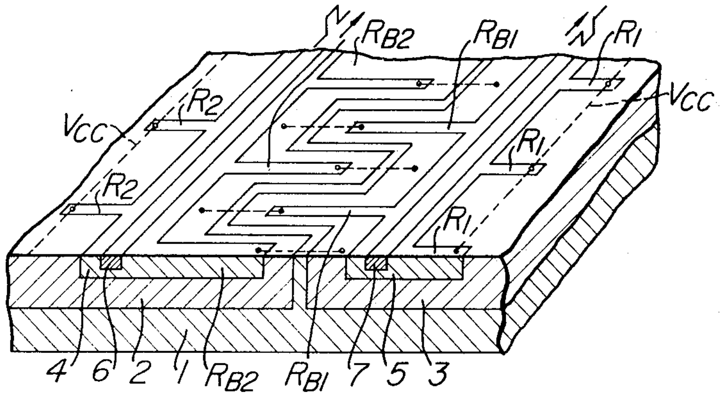
FIGS. 4 and 5 are schematic diagrams of constructions of the circuit shown in FIG. 3 as it is integrated.
Figure 5:
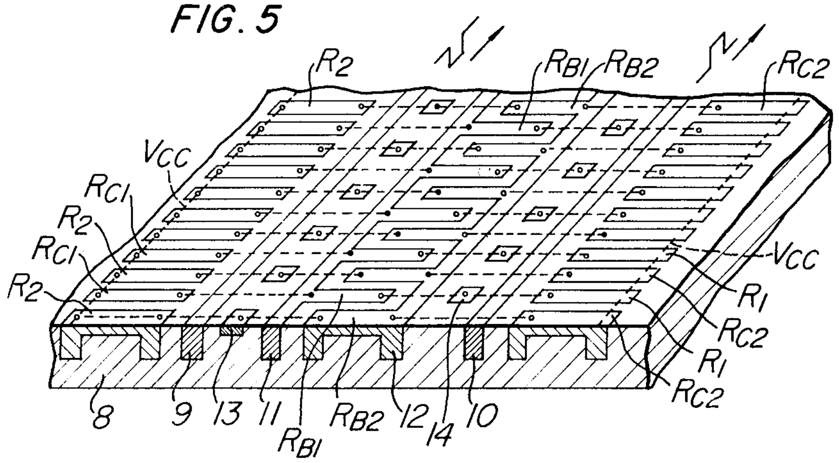

The construction of the circuit of FIG. 3 according to the invention as it is integrated is schematically shown in FIGS. 4 and 5.

Referring to FIG. 4, an N-type epitaxial layer, for example, is formed on the P-type substrate 1 by a well-known method, and P-type high-concentration impurities are selectively diffused in the N-type epitaxial layer thereby to form collector regions 2 and 3 of the transistors $T_{r1}$ and $T_{r2}$ respectively. This process can be easily conducted by the conventional IC technique of isolation. Then base regions 4 and 5 are formed by diffusing P-type impurities in the collector regions respectively while at the same time forming the resistances $R_1$, $R_2$, $R_{B1}$ and $R_{B2}$ in the circuit of FIG. 1b also by the diffusion of P-type impurities. The length of the diffused region constituting each resistance is determined by a predetermined resistance value. Next, an emitter region is formed by diffusing N-type impurities in each of the base regions. The surface of an object thus constructed is covered with an oxide film, and aluminum is wired along the dotted lines in the drawing by a known method, thereby completing the integration of the circuit as shown in FIG. 3. Although the transistors $T_{r1}$ and $T_{r2}$ are uniformly distributed in this embodiment, other configurations are possible in which a plurality of them are separately formed.

FIG. 5 shows still another embodiment of the invention which employs MOS transistors as the transistors $T_{r1}$ and $T_{r2}$ in the circuit of FIG. 3. On a substrate 8 are formed by a well-known method an MOS transistor $T_{r1}$ comprising a source 9, drain 11 and gate 13, another MOS transistor $T_{r2}$ comprising a source 10, drain 12 and gate 14, and resistances $R_1$, $R_2$, $R_{C2}$, $R_{B1}$ and $R_{B2}$. The surface of an object thus constructed is covered with an oxide film, and then aluminum is wired along the dotted lines in the drawing by a well-known method, thereby to integrate the circuit of FIG. 3 by use of the MOS transistors $T_{r1}$ and $T_{r2}$. Incidentally, it is needless to say that the gates 13 and 14 of the MOS transistors $T_{r1}$ and $T_{r2}$ which are schematically shown in the drawing have, like the conventional MOS transistors, gate electrodes formed in a channel through an insulating film. In the embodiments of FIGS. 4 and 5, it is not necessary to specially form the resistances R and capacitances C of the transmission circuit because they are built in an integrated circuit as its intrinsic components.

We claim:

1. An active pulse transmission circuit adapted to be forming into an integrated circuit comprising:
- a plurality of negative resistance devices, each comprising first and second transistors each of which has an emitter, a collector and a base, the collector and base of each transistor being connected respectively to the base and collector of the other transistor, said collectors also being connected to a direct current voltage source, said device having a symmetrical construction with respect to a point between said collectors with which said voltage source is connected and at least one pair of first and second terminals derived from any given junction points in the device;
- a plurality of capacitors connected in parallel with respective ones of said devices across said pair of first and second terminals;
- a common conductor with which said first terminal is connected;
- at least one group of resistance elements, each resistance element being connected between said second terminals of respective adjacent ones of said devices;
- at least one pair of input terminals connected respectively to said first and second terminals of a first one of said devices; and
- at least one pair of output terminals connected respectively to said first and second terminals of any one of said devices other than said first one.

2. An active pulse transmission circuit according to claim 1, wherein each of said devices has one pair of first and second terminals, said resistance elements are provided in one group for said second terminals of said pairs of respective ones of said devices, and thus each of said pair of input terminals and said pair of output terminals is provided in one pair, whereby a pulse of one kind is transmitted at a time.

3. An active pulse transmission circuit according to claim 2, wherein each of said devices has an emitter resistor connected to the emitter of said first transistor, and said pair of first and second terminals are derived across said emitter resistor.

4. An active pulse transmission circuit according to claim 1, wherein each of said devices has two pairs of first and second terminals provided respectively in the symmetrical halves of the device, said resistance elements are provided in two groups respectively for said second terminals of said two pairs of respective ones of said devices, and thus each of said pair of input terminals and said pair of output terminals is provided in two pairs, whereby pulses having two kinds of polarity are transmitted at a time.

5. An active pulse transmission circuit according to claim 4, wherein each of said devices has emitter resistors connected respectively to the emitters of said first and second transistors, and said two pairs of first and second terminals are derived across said emitter resistors, respectively.

6. An active pulse transmission circuit adapted to be formed into an integrated circuit comprising:
- first and second input terminals;
- first and second output terminals;
- first means for coupling said first input terminal to said first output terminal;
- second means for coupling said second input terminal to said second output terminal;
- a negative resistance element connected between said first and second means, including
  - first and second transistors, each of which comprises an input electrode, an output electrode, and a control electrode, the respective control and output electrodes of said first and second transistors being D. C. coupled to one another, while at least one of said first and second transistors has its input electrode connected to one of said first and second means, and
  - means for connecting a source of D. C. voltage to the output electrodes of each of said first and second transistors; and
- third means for D. C. coupling the input electrode of one of said first and second transistors to the other of said first and second means.

7. An active pulse transmission circuit according to claim 6, wherein said first means comprises first and second resistance elements connected between said first input terminal and said first output terminal, the common connection of said first and second resistance elements being connected to said negative resistance element, and wherein said second means comprises a conductor for directly connecting said second input terminal to said second output terminal.

8. An active pulse transmission circuit according to claim 7, further including a capacitor connected in parallel with said negative resistance element between said first and second means.

9. An active pulse transmission circuit according to claim 6, wherein said third means comprises a resistor element connected between the input electrode of said one of said first and second transistors and the other of said first and second means.

10. An active pulse transmission circuit according to claim 8, wherein said third means comprises a resistor element connected between the input electrode of said one of said first and second transistors and the other of said first and second means.

11. An active pulse transmission circuit according to claim 6, wherein the input electrodes of said first and second transistors are respectively connected directly to said first and second means.

12. An active pulse transmission circuit according to claim 11, further including first and second resistance elements respectively connected between the input electrodes of said first and second transistors and a source of reference potential.

13. An active pulse transmission circuit according to claim 12, wherein said first and second means each comprises means for respectively directly connecting said first and second input electrodes to said first and second output electrodes.

14. An active pulse transmission circuit according to claim 13, further including first and second resistors and capacitors connected in series between each of said first and second output terminals and said source of reference potential.

* * * * *